Oct. 11, 1927.
P. J. LUNATI
1,644,785
VEHICLE TURNTABLE
Filed Dec. 21, 1925 4 Sheets-Sheet 1
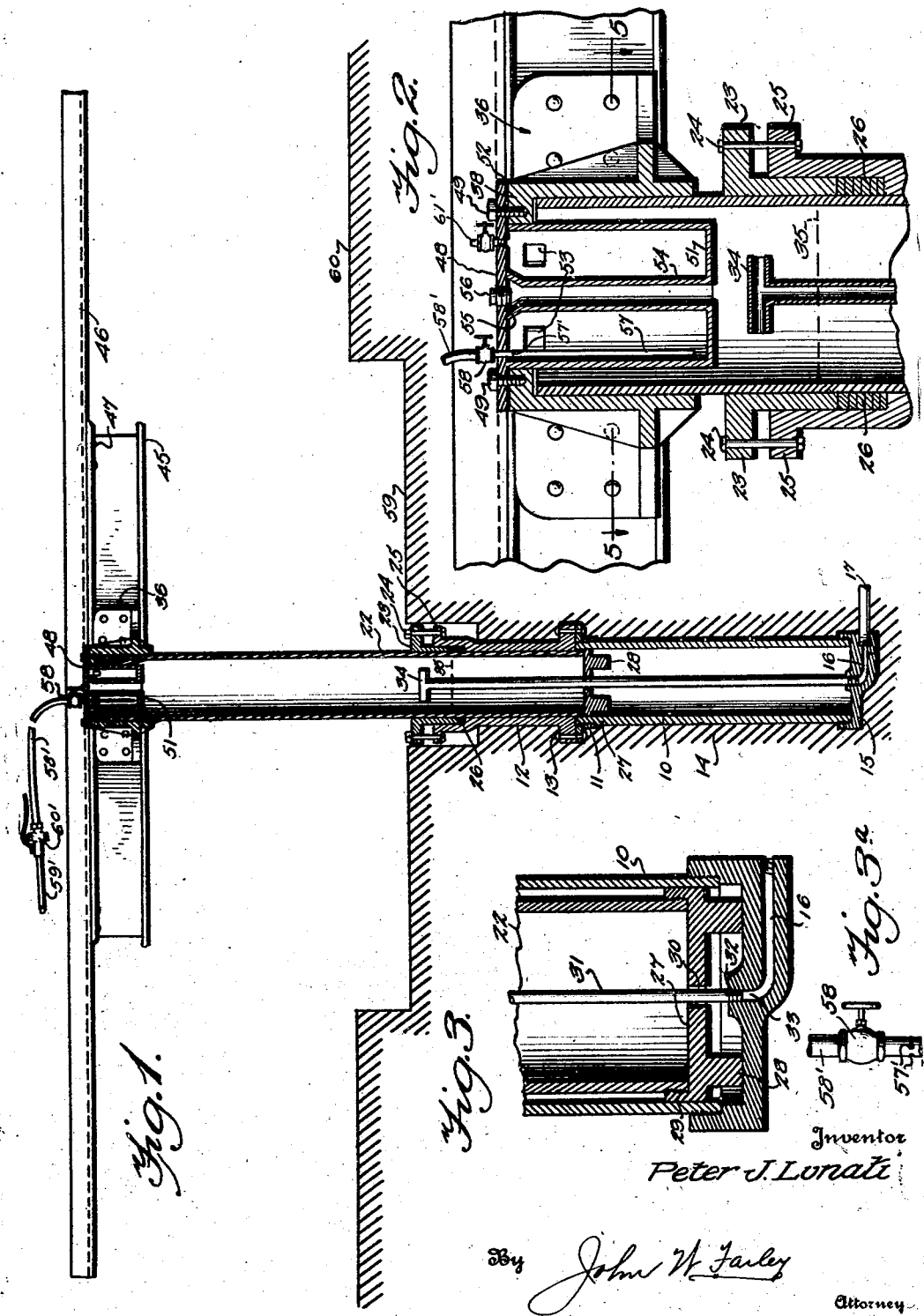
Inventor
Peter J. Lunati
By John W. Farley
Attorney Oct. 11, 1927.
P. J. LUNATI
1,644,785
VEHICLE TURNTABLE
Filed Dec. 21, 1925
4 Sheets-Sheet 2
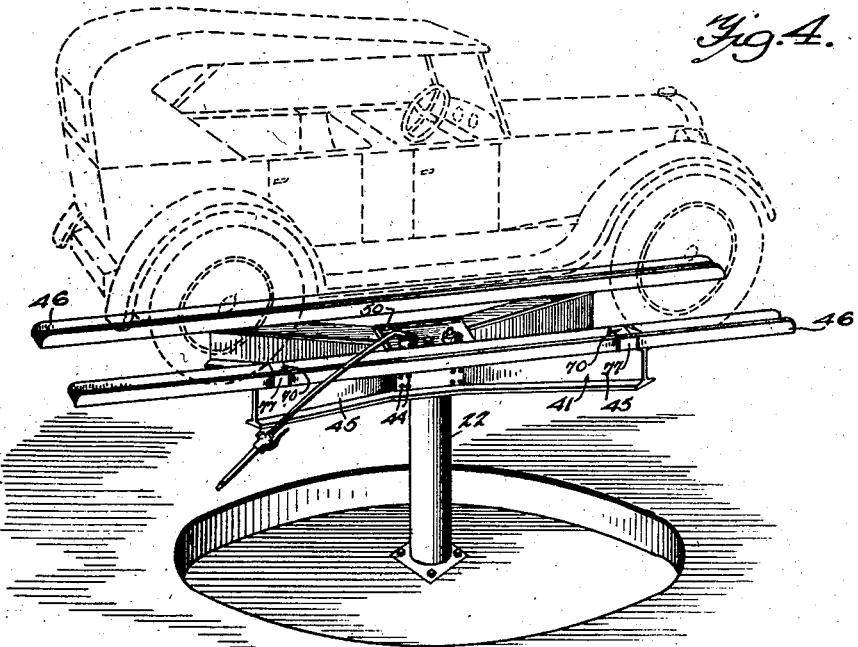
Fig.4.
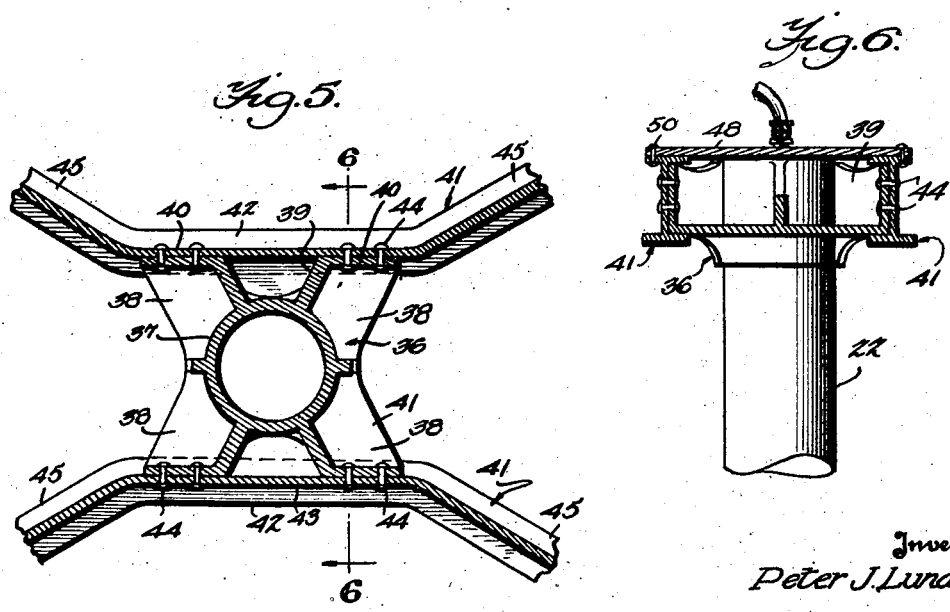
Fig.5.
Fig.6.
Inventor
Peter J. Lunati
By John W. Farley
Attorney Oct. 11, 1927.
P. J. LUNATI
1,644,785
VEHICLE TURNTABLE
Filed Dec. 21, 1925
4 Sheets-Sheet 3
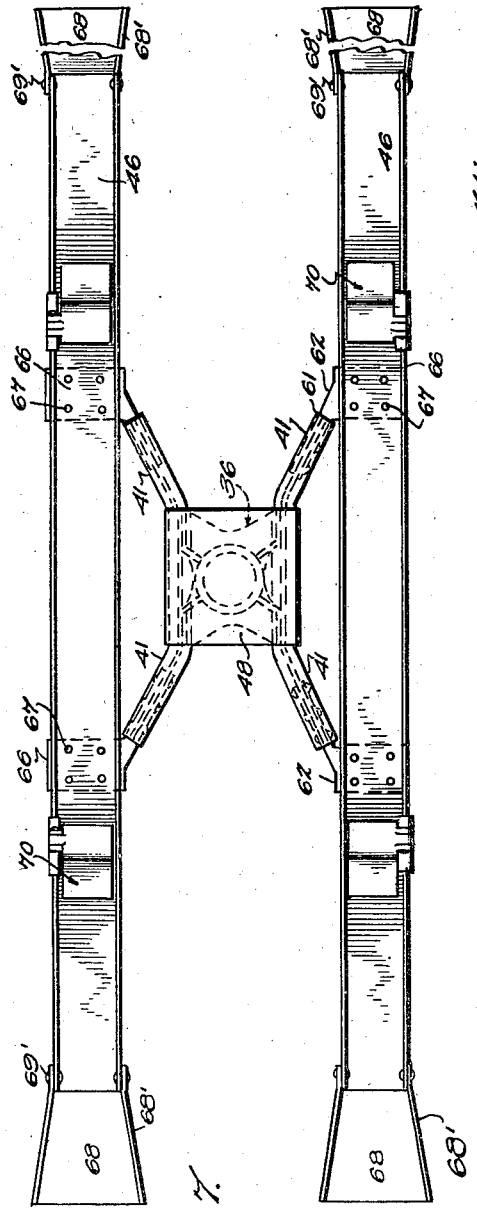
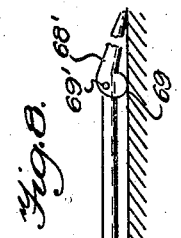
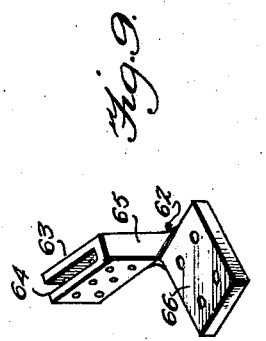
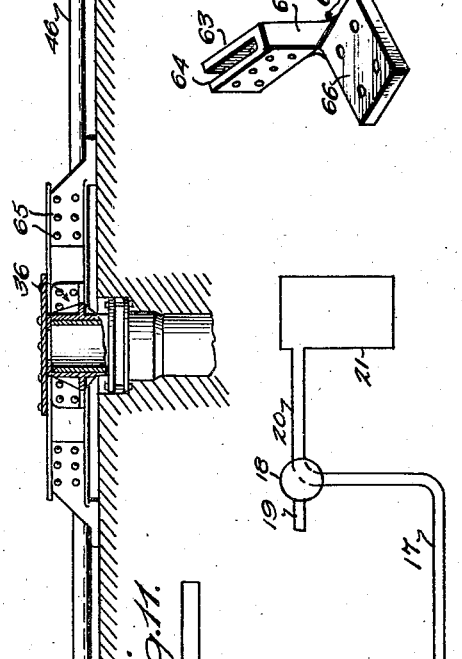
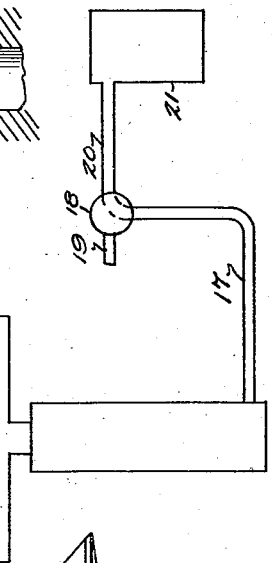
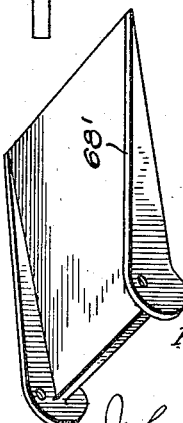
Inventor
Peter J Lunati
By John W Farley
Attorney Oct. 11, 1927.
P. J. LUNATI
1,644,785
VEHICLE TURNTABLE
Filed Dec. 21, 1925 4 Sheets-Sheet 4
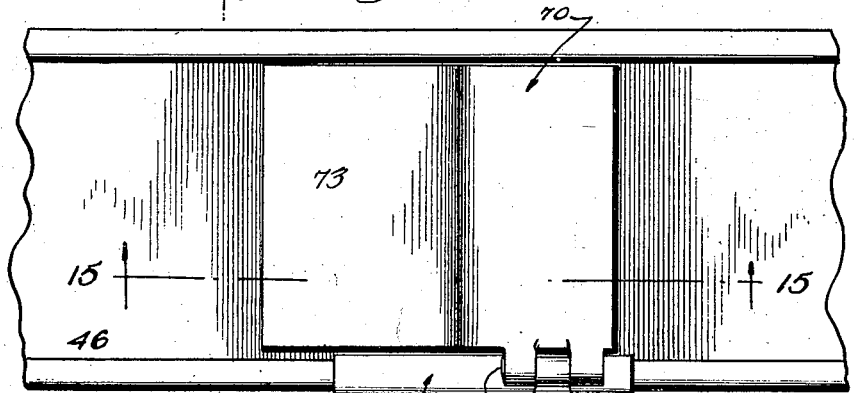
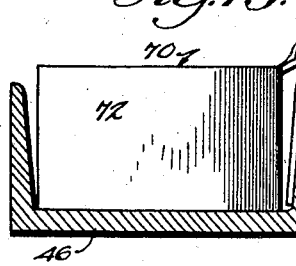
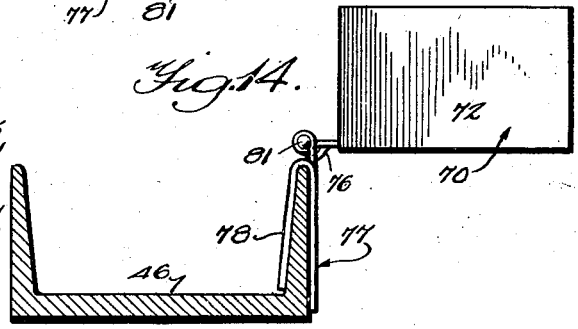
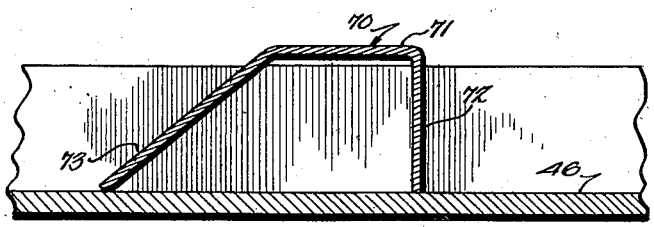
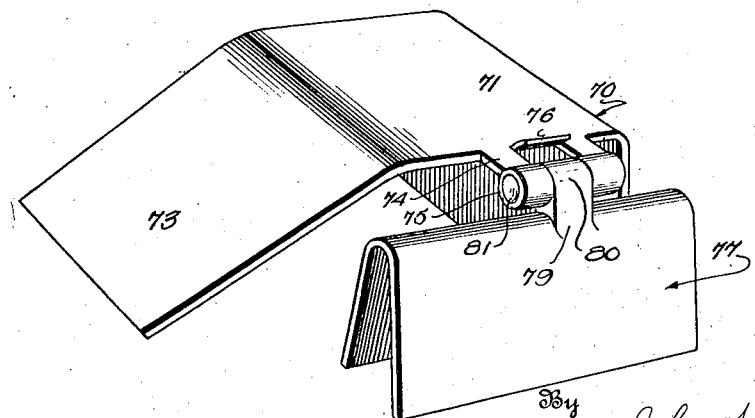
Inventor
Peter J. Lunati
By John W. Farley
Attorney Patented Oct. 11, 1927.

1,644,785

UNITED STATES PATENT OFFICE.

PETER J. LUNATI, OF MEMPHIS, TENNESSEE.

VEHICLE TURNTABLE.

Application filed December 21, 1925. Serial No. 76,856.

This invention relates to vehicle turn tables and is a division in part and a continuation in part of my copending application Serial No. 36,019, filed June 9, 1925.

An important object of the invention is to provide novel vehicle supporting means adapted to be rotated or lifted, or both, to facilitate working upon a vehicle and to permit it to be rotated whereby it may approach and leave the turn table from the same direction, A still further object is to provide vehicle supporting rails upon which the vehicle may rest and supporting means for the rails, the space between the ends of the rails being unobstructed for a material distance from their ends to permit free access to the lower side of the vehicle when the rails are elevated.

A still further object is to provide a central rotatable member to the upper end of which is secured a supporting member having arms secured to its opposite sides, the arms having parallel central portions secured to the supporting member and diverging ends adapted to support the rails.

A still further object is to provide a novel form of chock adapted to engage the wheels of the vehicle to properly retain it in position while the turn table is being turned or elevated.

A still further object is to provide means for locking the turn table against rotation while the vehicle is being moved on or from the vehicle supporting rails.

A still further object is to provide means for supporting the ends of the rails of the turn table while the vehicle is being moved on or off the vehicle supporting rails.

In the drawings I have shown several embodiments of the invention. In this showing—

Figure 1 is a central vertical sectional view through one form of the invention, Figure 2 is an enlarged central vertical sectional view showing a portion of the upper end of the piston and associated elements, Figure 3 is a similar view of the lower end of the cylinder showing the piston in lowered position, Figure 3ᵃ is a fragmentary detail elevation of the spray control valve and associated elements, Figure 4 is a perspective view showing a vehicle in position and the piston raised, Figure 5 is a section on line 5—5 of Figure 2, Figure 6 is a section taken substantially on line 6—6 of Figure 5, Figure 7 is a plan view of a modified form of supporting structure, Figure 8 is a central vertical sectional view through the same, parts being shown in elevation, Figure 9 is a detail perspective view of one of the supporting brackets employed in connection with the modified form of the invention, Figure 10 is a similar view of one of the locking members, Figure 11 is a diagrammatic view showing the air connections to the device, Figure 12 is a plan view of a portion of one of the vehicle rails showing the chock in position, Figure 13 is a detail section on line 13—13 of Figure 12, Figure 14 is a similar view showing the chock in inoperative position, Figure 15 is a section on line 15—15 of Figure 12, and, Figure 16 is a detail perspective of the chock detached.

Referring to the drawings, the numeral 10 designates a lower cylinder section provided at its upper end with a flange 11 to which is bolted an upper cylinder section 12, by bolts 13 or the like. The cylinder sections preferably are surrounded by a concrete or similar well 14 to provide reinforcement for the cylinder when pressure is introduced therein in a manner to be described. The lower end of the cylinder section 10 is provided with a cap 15 having a transverse air port 16 therein connected with an air pressure supply pipe 17. As shown diagrammatically in Figure 11 of the drawings, the pipe 17 is connected to a three-way valve 18 which has a pair of branch pipes 19 and 20. The pipe 19 opens to the atmosphere while the pipe 20 communicates with the interior of a pressure tank 21 supplied with air pressure from a suitable pump (not shown).

A hollow or tubular piston 22 is arranged to rotate and reciprocate within the cylinder sections as shown in Figure 1. A packing gland 23 surrounds the piston and is bolted as at 24 to an annular flange 25 formed integral with the upper cylinder section as shown. Packing 26 is provided to prevent leakage of air past the piston. The piston is provided at its lower end with a cap 27 threaded thereon and provided with a depending flange 28 to limit the downward movement of the piston as will be obvious. As shown in Figure 1, the cap 27 is provided with an annular flange 29 which reciprocates within the lower cylinder section while the piston proper is adapted to reciprocate within the upper cylinder section. The lower cylinder section is slightly larger in diameter than the upper cylinder section and it will be obvious that the flange 29 is adapted to contact with the lower end of the upper cylinder section to limit the upward movement of the piston. As clearly shown in Figure 3, the cap 27 is provided with a central opening 30 in which is arranged a vertical air pipe 31. The opening 30 is slightly larger in diameter than the pipe 31 to permit the passage of oil through the opening in a manner to be described. The lower end of the pipe 31 is threaded as at 32 within a vertical extension 33 of the air passage 16. The upper end of the air pipe 31 is provided with a T-head 34 as shown in Figure 2 for a purpose to be described. As shown in Figure 1, the cylinder and piston are adapted to contain oil to a level substantially as indicated by the numeral 35 in Figures 1 and 2. It will be obvious that the level of the oil is at all times below the T-head 34 so that it cannot flow into the air pipe 31.

A head indicated as a whole by the numeral 36 is carried by the upper end of the piston as indicated in Figures 1, 2, 5 and 6. This head includes a substantially cylindrical collar 37 which is pressed in position on the upper end of the piston and is provided with an inturned annular flange 38 at its upper end which is adapted to positively limit the downward movement of the collar. The head 36 is further provided with a plurality of outwardly extending arms 38 which are formed integral with the collar 37. Each of these arms includes substantially vertical ribs 39 which are arranged substantially radially of the piston and each of the ribs terminates in its outer end in longitudinal portions 40 as clearly shown in Figure 5. Integral webs 41, which are preferably horizontal, are adapted to reinforce the ribs 39 and 40.

The numeral 41 designates as a whole a pair of I beam supporting members each of which includes parallel central portions 42, the webs 43 of which are riveted to the ribs 40 as at 44. Outwardly of the parallel portions 42 the I beams diverge as at 45 and their outer ends are arranged beneath rails 46. The outer ends of the I beams may be riveted as at 47 or otherwise secured to the rails 46 as will be apparent. As shown in Figures 2 and 6, a cover plate 48 is arranged over the head 36 and associated elements. The plate is preferably secured to the flanges 38 of the head by screws 49. Rivets 50 or other fastening elements pass through the outer edges of the plate 48 and through the upper bases of the I beams 41 as shown in Figure 6. It will be obvious that the plate 48 and its connections to the I beams are adapted to prevent any tendency of the latter to rock downwardly at their outer ends when a vehicle is in position on the rails.

An oil container 51 is arranged within the upper end of the piston 22, as shown in Figure 2. This oil container is provided at its upper end with an outstanding horizontal flange which may be arranged between the cover plate 48 and the flange 38. The oil container is further provided with apertures 53 which communicate with the interior of the piston thereby effecting an equalization of pressure against the walls of the container 51 internally and externally thereof. This pressure equalization permits the use of relatively light material in forming the container 51, and in practice, relatively inexpensive light gage galvanized iron has been found excellent for this purpose. A central tube 54 extends throughout the length of the oil container and is provided at its upper end with a flared mouth 55. The plate 48 is provided above the tube 54 with an opening normally closed by a threaded plug 56. An outlet pipe 57 extends through the plate 48 and has its lower end arranged adjacent the bottom of the container 51. The pipe 57 is provided within the container 51 and preferably near the plate 48 with small apertures 57' for a purpose to be described. Above the plate 48 the pipe 57 is provided with a suitable valve 58 and the pipe is adapted for connection above this valve with a suitable flexible hose 58' having a spray nozzle 59' connected to its outer end and adapted to be controlled by a suitable manually controlled valve 60'. A valve 61' provides means for filling the container 51 in a manner to be described.

As shown in Figure 1, a depression 59 surrounds the piston and is preferably circular and of such a diameter as to receive the I beams 45 when the device is in its lowered position. The rails 46 are adapted to rest upon the ground 60 to permit a vehicle to be driven upon the rails 46.

In Figures 7 and 8 of the drawings I have shown a modified form of vehicle supporting means. As shown, I employ a head 36 and I beams 41 secured thereto as previously described. In the modified form however, the ends 61 of the I beams terminate inwardly of the rails 46 as shown in Figure 7. Brackets 62 are adapted to support the rails. Each of these brackets comprises an angular portion 63 which is bifurcated as shown to provide a slot 64 adapted to receive the web of the outer end of one of the I beams 41. The portion 63 of the bracket is preferably riveted to the I beam as at 65. Outwardly of the angular portions 63 the brackets 64 are provided with downwardly inclined portions 65 which terminate in flat plates 66 which are adapted to be arranged transversely beneath the rails 46 and may be riveted thereto as at 67. In this form of the device it will be obvious that the rails 46 may be arranged with their bottoms substantially flush with the bottoms of the I beams 41 so that no depression 59 is required. In the modified form of the invention I have provided means for gripping the surface of the earth to prevent the device from revolving when a vehicle is being driven thereon or is leaving the rails. As shown in Figures 7 and 10, the numeral 68 designates an inclined plate arranged adjacent the end of each of the rails. The inner ends of the plates are arranged adjacent the webs of the rails substantially flush therewith, while the outer edges of the plates are adapted to rest upon the ground. The plates are provided with flanges 68' at their edges and each flange is provided adjacent its inner end with a cam portion 69. The flanges are adapted to be pivotally connected to the rails by bolts or the like 69'.

In Figures 12 to 16 of the drawings I have illustrated a form of chock particularly adapted for use in connection with the invention. This chock comprises a relatively heavy stamped steel member 70 having upper horizontal portions 71 and opposite walls 72 and 73. One of the walls 72 may be arranged vertically and the other wall 73 inclined as clearly shown in Figure 14. The horizontal portion 71 of the chock is provided at one side with extensions 74 provided with eyes 75 at their outer ends. Intermediate the extensions 74 the chock is provided with an upwardly and outwardly extending stop 76 for a purpose to be described. Means is provided for mounting the chock whereby it may be reciprocated along the rails. As shown, I provide a sheet metal member 77 which is folded centrally to provide opposite portions 78 which are adapted to embrace one side of a rail. The member 77 is provided intermediate its ends with a vertical extension 79 terminating in an eye 80 arranged in alinement with the eyes 75. A hinge pin 81 passes through the eyes 75 and 80 to pivotally connect the members 70 and 77.

The operation of the apparatus is as follows:

With the rails 66 lowered to contact with the ground, a vehicle may be driven thereover to a substantially central position above the piston and cylinder. The chocks then may be swung from the position indicated in Figure 14 to the position shown in Figure 13 and they may be slid along the rails by means of the members 77 to contact with the wheels. It will be obvious that the member 76 is adapted to engage the outer face of the member 77 to limit the outward turning movement of the chock as indicated in Figure 14. With the vehicle properly fixed in position the valve 18 will be arranged in the position shown in Figure 9 of the drawings wherein compressed air will be admitted into the upper end of the piston. The admission of the air will lift the piston as indicated in Figure 1 until the flange 29 contacts with the lower end of the upper cylinder section 12. It will be obvious that oil within the piston will flow downwardly through the opening 30 during the lifting operation. The level of the oil will remain stationary as shown in Figure 1 and will under no circumstances flow into the T-head 34. Air pressure is adapted to maintain the vehicle in lifted position as long as desired. When it is desired to lower the vehicle the valve 18 may be rotated through an angle of 90° in a clockwise direction as viewed in Figure 11 whereby communication will be established between the interior of the piston and the atmosphere. The weight of the vehicle and the movable parts of the apparatus will then cause the piston to move downwardly, and downward movement will be retarded by the dash-pot action of the relatively small opening 30.

As shown in Figures 4 and 7, access may be had to the bottom of the vehicle throughout the greater portion of its length since there are no braces or other elements arranged between the rails other than the I beams 41. Since the centers of the I beams are spaced and their ends diverge outwardly it will be apparent that mechanics may move along the bottom of the car from the ends thereof to the head 36. As previously stated the pressure of the air within the cylinder 22 is communicated to the interior of the oil container through the openings 53 and with the valve 58 open, the valve 60' may be controlled by the operator for spraying oil on the springs of the vehicle. The pressure of the air in the container 51 forces oil through the pipe 57 from the lower end thereof, while air will be forced into the pipe 57 through the small openings 57'. This action causes the mixture of oil and air whereby the former will be atomized at the nozzle 59' to provide an effective oil spray. The container 51 may be filled with lubricant by connecting a filling hose to the valve 61' and opening the latter. The piston and cylinder may be filled with oil by removing the plug 56 and allowing the oil to flow downwardly through the tube 54. When the piston and cylinder are being thus filled with oil it will be apparent that the T-head 34 will prevent the oil from flowing downwardly into the air pipe 31.

It will be obvious that it is desired to provide means for preventing sudden accidental downward movement of the vehicle while mechanics are working thereunder. The cylinder sections are surrounded by the concrete 14 to provide reinforcement therefor to prevent the walls of the cylinder from blowing out under the influence of the pressure therein. Should the pressure within the piston and cylinder be released due to breakage of any of the other parts, such as the blowing out of the plug 56, it will be obvious that the downward movement of the vehicle will be retarded by the dash-pot action of the opening 30 thus allowing a mechanic working beneath the vehicle to escape before the piston reaches its lower position.

While it has been pointed out that the springs, oil cups, etc., may be lubricated while the vehicle is in raised position it will be obvious that any desired mechanical work may be performed while the vehicle is elevated. Under some conditions it is desirable to tilt the vehicle and this readily may be done by driving either end of the car upon the rails 46 and placing the chocks against the wheels whereupon the piston may be lifted in the manner described and the vehicle tilted due to the fact that two of the wheels remain upon the ground. The ample space provided between the rails will permit the mechanic to work freely upon the vehicle.

From the foregoing description the means for lifting and lowering the vehicle will be apparent. As previously described the piston is adapted to be rotated to permit the vehicle to be rotated with the rails. It will be obvious however, that the superstructure including the supporting head, the I beams and the vehicle rails may be used in connection with any suitable form of turn table device and need not be limited to its application to the lifting device described. Under some conditions it is desirable to permit the vehicle to leave the rails at a different angle from that at which it approaches, and sometimes it is necessary to turn the vehicle completely when the device is arranged in a corner or the like. Under such conditions the operator may freely rotate the vehicle so that it may leave at any desired angle.

It is to be understood that the forms of my invention herewith shown and described are to be taken as preferred examples of the same and that various changes in the shape, size and arrangement of parts may be resorted to without departing from the spirit of the invention or the scope of the subjoined claims.

I claim:

1. A device of the character described comprising a cylinder, a piston mounted to rotate therein, a head carried by said piston, diverging arms secured to opposite sides of said head, and a pair of parallel rails mounted on said arms.

2. A device of the character described comprising a cylinder, a piston mounted to rotate therein, a relatively small head carried by said piston at its upper end, a pair of supports arranged on opposite sides of said head, said supports including parallel central portions secured to said head, the ends of said supports extending outwardly, and rails carried by the ends of said supports.

3. A device of the character described comprising a cylinder, a piston mounted to rotate therein, a relatively small head carried by said piston, a pair of beams arranged on opposite sides of said head, said beams including parallel central portions the webs of which are secured to said head, the ends of said beams extending outwardly from said head, and a pair of rails supported on the outer ends of said beams.

4. A device constructed in accordance with claim 3 provided with a plate arranged across and secured against the upper end of said head, the opposite edges of said plate being secured to the upper bases of said beams.

5. A device of the character described comprising a cylinder, a piston mounted to rotate therein, a relatively small head carried by said piston, a pair of I beams arranged on opposite sides of said head, said beams including parallel central portions the webs of which are secured to said head, the ends of said beams extending outwardly substantially radially of said head, a bracket associated with each end of said beams, each of said brackets including a portion arranged parallel to and bifurcated to receive the end of the web portion of a beam and secured thereto, each bracket further including a relatively flat horizontal outer end, and a pair of rails supported on the outer ends of said brackets.

6. A device of the character described comprising a turn table arranged in proximity to the ground and including a pair of rails, and a plate pivotally connected at one end to each end of each of said rails, the other ends of said plates normally contacting with the ground, one of said plates including a portion adapted to grip against the ground when the plate is in normal position to prevent rotation of said turn table.

7. A device of the character described comprising a plate adapted to be pivotally connected at one end to one end of a turn table rail arranged in proximity to the ground, the other end of said plate normally contacting with the ground, and a cam carried by said plate and adapted to grip against the ground to prevent rotation of said turn table when said plate is in normal position.

8. A device of the character described comprising a turn table arranged in proximity to the ground and including a pair of rails, plates pivotally connected at one end to each end of said rails, said plates normally contacting with the ground, and cams carried by said plates adapted to grip against the ground to support the ends of said rails.

9. A device of the character described comprising a movable central supporting member, a relatively small head carried by said member, a pair of supports arranged on opposite sides of said head and including central parallel portions secured thereto, the ends of said supports projecting outwardly from said head, and vehicle supporting rails carried by the ends of said supports.

10. A device of the character described comprising a movable central supporting member, a head carried by said member, a pair of supports arranged on opposite sides of said head and having central parallel portions secured theerto, the ends of said supports extending outwardly from said head, a securing member arranged over said head and extending therebeyond, the outer portions of said securing member being secured to the central parallel portions of said supports, and vehicle rails carried by the ends of said supports.

11. A device of the character described comprising a pair of movable vehicle supporting rails, a plate pivotally connected at its inner end to each end of each of said rails, said plates being adapted to assume normal positions with their outer ends inclined downwardly and contacting with the ground, and a cam carried by one of said plates adjacent the inner end thereof, and adapted to contact with the ground when said last named plate is in normal position.

12. A device of the character described comprising a pair of movable vehicle supporting rails arranged in proximity to the ground, and a plate pivotally connected at its inner end to each end of each of said rails, each of said plates having a portion adapted to form a substantial continuation of one of said rails and normally being inclined downwardly whereby its outer end contacts with the ground to be supported thereby, each of said plates including side flanges, and a cam carried by one of said side flanges and adapted to contact with the ground when the plate which carries said last mentioned side flange is in normal position.

13. A vehicle turntable lift comprising a cylinder, a piston mounted to reciprocate and rotate in the cylinder, a head mounted adjacent one end of the piston, a pair of channel shaped arms attached on opposite sides of the head and diverging therefrom, and a pair of parallel vehicle supporting rails, one located on each side of the head and attached to the outer divergent ends of the arms on the corresponding side of the head.

In testimony whereof I affix my signature.

PETER J. LUNATI.